United States Patent Office 2,879,304
Patented Mar. 24, 1959

2,879,304

PROCESS FOR THE MANUFACTURE OF POLYENE COMPOUNDS

Otto Isler, Marc Montavon, and Rudolf Rüegg, Basel, and Paul Zeller, Neuallschwil, near Basel, Switzerland, assignors to Hoffmann-La Roche Inc., Nutley, N.J., a corporation of New Jersey No Drawing. Application July 13, 1956
Serial No. 597,584

Claims priority, application Switzerland July 22, 1955

3 Claims. (Cl. 260—611)

The invention concerns a process for the preparation of polyene compounds which comprises reacting 5-[2,6,6-trimethylcyclohexen - (1) - yl]-3-methyl-pentadien-(2,4)-al-(1) [β-ionylidene-acetaldehyde] or 5-[2,6,6-trimethyl-cyclohexadien - (1,3)-yl]-3-methyl-pentadien-(2,4)-al-(1) [dehydro-β-ionylidene-acetaldehyde] in an inert solvent with a 2-methyl-crotylidene-(1)-triarylphosphine-4-ether or a 2-methyl-crotylidene-(1)-triarylphosphine-4-acetal or with the same compounds wherein the aryl groups carry alkyl or alkoxy radicals and heating the condensation product.

The starting materials may be obtained for example as follows:

*Dehydro-β-ionylidene-acetaldehyde.*—β-ionone is condensed with ethyl bromo-acetate by means of a Reformatsky reaction, water is split off from the condensation product and the β-ionylidene-acetic acid ester formed is brominated by means of N-bromo-succinimide; the product is heated with quinoline, the dehydro-β-ionylidene-acetic acid ester produced is reduced by means of lithiumaluminum hydride and the reduction product is oxidized to the corresponding aldehyde by means of manganese dioxide.

*2-methylcrotylidene-(1)-triarylphosphines.*—A 1-halo-2-methyl-butene-(2)-4-ether or 1-halo-2-methyl-butene-(2)-4-acetal, such as 2-methyl-4-methoxy-crotyl bromide (prepared according to J. Am. Chem. Soc., 67, 1627 [1945] or 2-methyl-4,4-diethoxy-crotyl bromide (prepared according to Annalen der Chemie, 568, 1 [1950] by pyrolysis of 3-methyl-crotonic-aldehyde-diethylacetal, bromination of the 3-methyl-1-ethoxy-butadiene formed and treatment of the brominated product with sodium alcoholate), is added to a solution of a triarylphosphine in benzene while stirring at room temperature. After several hours' standing the 2-methyl-crotyl-(1)-triarylphosphonium halide compound which separates is filtered or decanted off, washed with benzene, dried in vacuo and then suspended in absolute ether. In order to separate hydrogen halide, the equimolar amount of phenyllithium or butyllithium solution in ether is added while stirring. A deep red or brown solution or suspension of the 2-methylcrotylidene-(1)-triarylphosphine compound is thus obtained; it is used directly for the condensation.

Especially suitable starting materials are lower alkyl ethers of 4-hydroxy-2-methylcrotylidene-(1)-triarylphosphines, such as the methyl, ethyl, propyl, butyl, isopropyl ether; aralkyl ethers, such as the benzyl and the phenethyl ether; aryl ethers, such as the phenyl ether; ethers with alcohols which possess the structure of internal acetals, e.g. with tetrahydropyranyl-(2)-alcohol, or with α-alkoxy-alkanols, e.g. with α-ethoxy-ethanol. Other appropriate starting materials are the 4-acetals of 2-methylcrotylidene-(1)-triarylphosphines, such as 4,4 - dialkoxy - 2-methyl-crotylidene-(1) - triarylphosphines, e.g. 4,4 - diethoxy - 2-methylcrotylidene-(1)-triphenylphosphine, 4,4-dimethoxy-2-methylcrotylidene-(1)-triphenylphosphine; 4,4,-diaralkoxy-2-methylcrotylidene-(1)-triarylphosphines, e.g. 4,4-dibenzyloxy-2-methylcrotylidene-(1) - triphenylphosphines; 4,4-alkylenedioxy-2-methylcrotylidene - (1) - triarylphosphines, e.g. 4,4-ethylenedioxy - 2 - methylcrotylidene-(1)-triphenylphosphine.

In the first stage of the synthesis the β-ionylidene-acetaldehyde or, respectively, the dehydro-β-ionylidene-acetaldehyde is condensed with the 4-substituted 2-methylcrotylidene-(1)-triarylphosphine compound; in the second stage the condensation product formed is converted into the polyene compound, triarylphosphineoxide being split off at the same time. The two reaction steps are preferably carried out in the same reaction vessel and without isolation of the intermediate products. It is recommendable to use equivalent amounts of the reaction components or to use the triarylphosphine compound in excess. Furthermore, the reaction is suitably carried out in an inert solvent, such as ether, petroleum ether, benzene, dioxane, tetrahydrofurane, and the like. Preferably the starting materials are mixed in a stirring vessel at room temperature or at slightly elevated temperature, the air being best replaced by an inert gas such as nitrogen. Upon addition of a solution of the β-ionylidene-acetaldehyde or, respectively, of the dehydro-β-ionylidene-acetaldehyde to the solution of the 2-methylcrotylidene-(1)-triarylphosphine compound, the reaction which is exothermic starts immediately. Depending upon the kind of solvent used, the condensation product will remain in solution or it will separate, the coloration of the reaction mixture getting lighter in most cases. According to a preferred mode of procedure of the first step of the reaction an ethereal solution of the β-ionylidene-acetaldehyde or, respectively, of the dehydro-β-ionylidene-acetaldehyde is added to a suspension or to a solution of the 2-methylcrotylidene-(1)-triarylphosphine compound in ether at room temperature. Upon standing the condensation product decomposes slowly into the polyene compound and triarylphosphine oxide. If the solution of the condensation product is heated the decomposition is fast. A preferred method for decomposing the condensation product consists in refluxing the reaction product in ether solution for several hours. Once the reaction is completed, the polyene compound produced may be isolated by extracting the triarylphosphine oxide formed with water from the organic phase, and by drying and evaporating the latter. The polyene compound produced may then be purified from impurities, such as organic phosphorus compounds, by dispersing between solvents and by chromatography.

When starting from a 2-methylcrotylidene-(1)-triarylphosphine-4-ether, e.g. from 4-methoxy-2-methylcrotylidene-(1)-triphenylphosphine or 4-[tetrahydropyranyloxy-(2)]-2-methylcrotylidene-(1)-triphenylphosphine and β-ionylidene-acetaldehyde or, respectively, dehydro-β-ionylidene-acetaldehyde, the process described herein leads to the corresponding vitamin A ether or, respectively, vitamin A₂ ether. When a 4-acetal, such as 4,4-diethoxy-2-methylcrotylidene-(1)-triphenylphosphine, is used instead of the 4-ethers referred to above, the corresponding vitamin A acetals, e.g. vitamin A aldehyde diethylacetal or, respectively, vitamin A₂ aldehyde diethylacetal are obtained; the acetals and those ethers of vitamin A and vitamin A₂ which have acetal structure may be converted into vitamin A aldehyde or vitamin A or, respectively, into vitamin A₂ aldehyde or vitamin A₂ by hydrolysis in acid medium. The hydrolysis may e.g. be performed in a manner known per se by treatment of e.g. vitamin A tetrahydropyranyl ether, vitamin A aldehyde diethylacetal, vitamin A₂ tetrahydropyranyl ether or vitamin A₂ aldehyde diethylacetal with an aqueous mineral acid, such as sulfuric acid, or with a non-aqueous or an aqueous organic acid, such as acetic acid or p-toluenesulfonic acid. It is preferred to hydrolyze the vitamin A ethers with acetal structure, such as the tetrahydropyranyl or α-alkoxyalkyl ethers, in alcoholic solution by means of p-toluenesulfonic acid at room temperature or at slightly elevated temperature, whereas the vitamin A acetals are suitably hydrolyzed by means of aqueous sulfuric acid.

EXAMPLE

*Vitamin A-methylether*

To a deep red solution of 2-methyl-4-methoxy-crotylidene-(1)-triphenylphosphine—prepared from 12.5 g. of 2-methyl-4-methoxy-crotyl - (1) - triphenylphosphonium-bromide (melting point 153–155°) and 1.93 g. of phenyl-lithium in 500 cc. of dry benzene—is added dropwise in the course of 5 minutes in nitrogen atmosphere a solution of 6 g. of 5-[2,6,6-trimethylcyclohexen-(1)-yl]-3-methyl-pentadien-(2,4)-al-(1) in 50 cc. of dry benzene. The reaction mixture is stirred during 6 hours at 60°, filtered from insoluble material, the filtrate is washed with water and dried over sodium sulphate. After evaporation of the solvent, the oily residue is taken up in little petroleum ether, the solution is filtrated through a short-necked column of aluminum oxide (according to Brockmann, grade III), the column is eluted with petroleum ether and the solvent is evaporated. There is obtained vitamin A methylether which in the ultraviolet spectrum shows a maximum of absorption at 326 m$\mu$ (in petroleum ether).

We claim:

1. A process for the production of a member of the group consisting of vitamin A ether, vitamin $A_2$ ether, vitamin A acetal and vitamin $A_2$ acetal, which comprises condensing in an inert atmosphere approximately equimolecular proportions of an aldehyde selected from the group consisting of 5-[2,6,6-trimethylcyclohexen-(1)-yl]-3-methyl-pentadien-(2,4)-al-(1) and 5-[2,6,6-trimethylcyclohexadien-(1,3)-yl]-3-methyl-pentadien-(2,4) - al-(1) in an inert solvent selected from the group consisting of ether, petroleum ether, benzene, dioxane and tetrahydrofurane at a temperature from about room temperature to reflux temperature with a member of the group consisting of 2-methyl-crotylidene-(1)-triarylphosphine-4-ether and 2-methyl-crotylidene-(1)-triarylphosphine-4-acetal, and heating the condensation product to obtain said vitamin A compound.

2. A process as in claim 1 wherein 4-methoxy-2-methylcrotylidene-(1)-triphenylphosphine is used as starting material.

3. A process for the production of vitamin A methyl ether which comprises condensing 5-[2,6,6-trimethyl-cyclohexen-(1)-yl]-3-methyl-pentadien-(2,4)-al-(1) in an inert atmosphere with approximately an equimolecular proportion of 2-methyl-4-methoxycrotylidene-(1)-triphenylphosphine in benzene at a temperature from about room temperature to reflux temperature and heating the condensation product at about 60° C. to obtain a said vitamin A methyl ether.

References Cited in the file of this patent

Milas: Vitamins and Hormones, vol. 5, pp. 1 to 38 (1947).

Van Dorp et al.: Nature, vol. 160, Aug. 9, 1947, p. 189.

Wittig et al.: Chem. Berichte, vol. 87, pp. 1318–30 (1954).